United States Patent
Ni et al.

(10) Patent No.: US 10,848,838 B2
(45) Date of Patent: *Nov. 24, 2020

(54) METHOD AND SYSTEM FOR GENERATING A TIME-LAPSE VIDEO

(71) Applicant: Oath Inc., New York, NY (US)

(72) Inventors: Bin Ni, Fremont, CA (US); Benoit Schillings, Los Altos Hills, CA (US); Stephen Lee Hodnicki, Sunnyvale, CA (US); Michael Chang-Chen, San Jose, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,994

(22) Filed: Jun. 17, 2019

(65) Prior Publication Data

US 2019/0306589 A1  Oct. 3, 2019

Related U.S. Application Data

(63) Continuation of application No. 15/846,351, filed on Dec. 19, 2017, now Pat. No. 10,327,046.

(51) Int. Cl.
| | |
|---|---|
| *H04N 5/77* | (2006.01) |
| *H04N 21/8549* | (2011.01) |
| *G11B 27/031* | (2006.01) |
| *G06K 9/00* | (2006.01) |
| *H04N 21/2187* | (2011.01) |
| *H04N 21/234* | (2011.01) |
| *H04N 21/2343* | (2011.01) |
| *H04N 5/93* | (2006.01) |

(52) U.S. Cl.
CPC ..... *H04N 21/8549* (2013.01); *G06K 9/00751* (2013.01); *G11B 27/031* (2013.01); *H04N 21/2187* (2013.01); *H04N 21/23418* (2013.01); *H04N 21/23424* (2013.01); *H04N 21/234336* (2013.01)

(58) Field of Classification Search
CPC ........ G06T 2207/10016; H04N 5/2621; H04N 5/262; G06K 2009/00738; G08B 13/19673
USPC ........ 386/226, 278, 281, 230, 229, 248, 343
See application file for complete search history.

(56) References Cited

U.S. PATENT DOCUMENTS

| | | | | |
|---|---|---|---|---|
| 10,083,360 B1* | 9/2018 | Woolley | ........... | G08B 13/19602 |
| 2019/0348075 A1* | 11/2019 | Derbanne | .......... | H04N 5/23258 |

\* cited by examiner

*Primary Examiner* — Robert Chevalier
(74) *Attorney, Agent, or Firm* — Cooper Legal Group, LLC

(57) ABSTRACT

One or more computing devices, systems, and/or methods for generating and/or presenting time-lapse videos and/or live-stream videos are provided. For example, a plurality of video frames may be extracted from a video. A first set of video frames and a second set of video frames may be identified from the plurality of video frames. The first set of video frames may be combined to generate a first time-lapse video frame and the second set of video frames may be combined to generate a second time-lapse video frame. A time-lapse video may be generated based upon the first time-lapse video frame and the second time-lapse video frame. In another example, a time-lapse video may be generated based upon a recorded video associated with a live-stream video. The time-lapse video may be presented. Responsive to a completion of the presenting the time-lapse video, the live-stream video may be presented.

20 Claims, 12 Drawing Sheets

900A

905A

| Identifier | Window Size |
|---|---|
| 1 | 1 |
| 2 | 1 |
| 3 | 2 |
| 4 | 2 |
| 5 | 8 |
| 6 | 30 |
| 7 | 8 |
| 8 | 2 |
| 9 | 2 |
| 10 | 1 |
| 11 | 1 |

| Identifier | Window Size |
|---|---|
| 1-2 | 1 |
| 3-10 | 2 |
| 11-20 | 8 |
| 21-40 | 30 |
| 41-50 | 8 |
| 51-58 | 2 |
| 59-60 | 1 |

FIG. 9B

METHOD AND SYSTEM FOR GENERATING A TIME-LAPSE VIDEO

CROSS REFERENCE TO RELATED APPLICATION

This application claims priority to and is a continuation of U.S. application Ser. No. 15/846,351, filed on Dec. 19, 2017, entitled "METHOD AND SYSTEM FOR GENERATING A TIME-LAPSE VIDEO", which is incorporated herein.

BACKGROUND

Many devices, such as mobile phones, tablets, laptops, mp4 players and/or desktop computers, provide video output by playing a video file obtained by streaming from a network. The video output may vary in presentation, appearance, quality, etc. depending upon the type of video editing and formatting used to create the video file, and the resolution of the video file. Different video outputs may be deemed appropriate for different devices and/or contexts. For example, a first representation of video content with time-lapsed visual content may be preferable for a mobile device with a slow network connection, while a second representation of the video content with complete visual content may be preferable for a large screen device with a high speed network connection.

SUMMARY

In accordance with the present disclosure, one or more computing devices and/or methods for generating a time-lapse video are provided. In an example, a request to generate a time-lapse video based upon a video may be received. Responsive to receiving the request, a plurality of video frames may be extracted from the video. The plurality of video frames may be stored in a memory structure. A first set of video frames and a second set of video frames may be identified from the plurality of video frames, the first set of video frames comprising a first number of video frames and the second set of video frames comprising a second number of video frames. The first set of video frames may be combined to generate a first time-lapse video frame. The second set of video frames may be combined to generate a second time-lapse video frame. The time-lapse video may be generated based upon the first time-lapse video frame and the second time-lapse video frame.

In accordance with the present disclosure, one or more computing devices and/or methods for presenting a live-stream video are provided. In an example, a plurality of video frames may be extracted from a recorded video associated with a live-stream video. The plurality of video frames may be stored in a memory structure. A time-lapse video may be generated based upon the plurality of video frames. Responsive to receiving a request to access the live-stream video, the time-lapse video may be presented. Responsive to a completion of the presenting the time-lapse video, the live-stream video may be presented from a first starting time.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 9A is a chart illustrating an example system for generating a window size data structure.

FIG. 9B is a chart illustrating an example system for generating a window size data structure.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
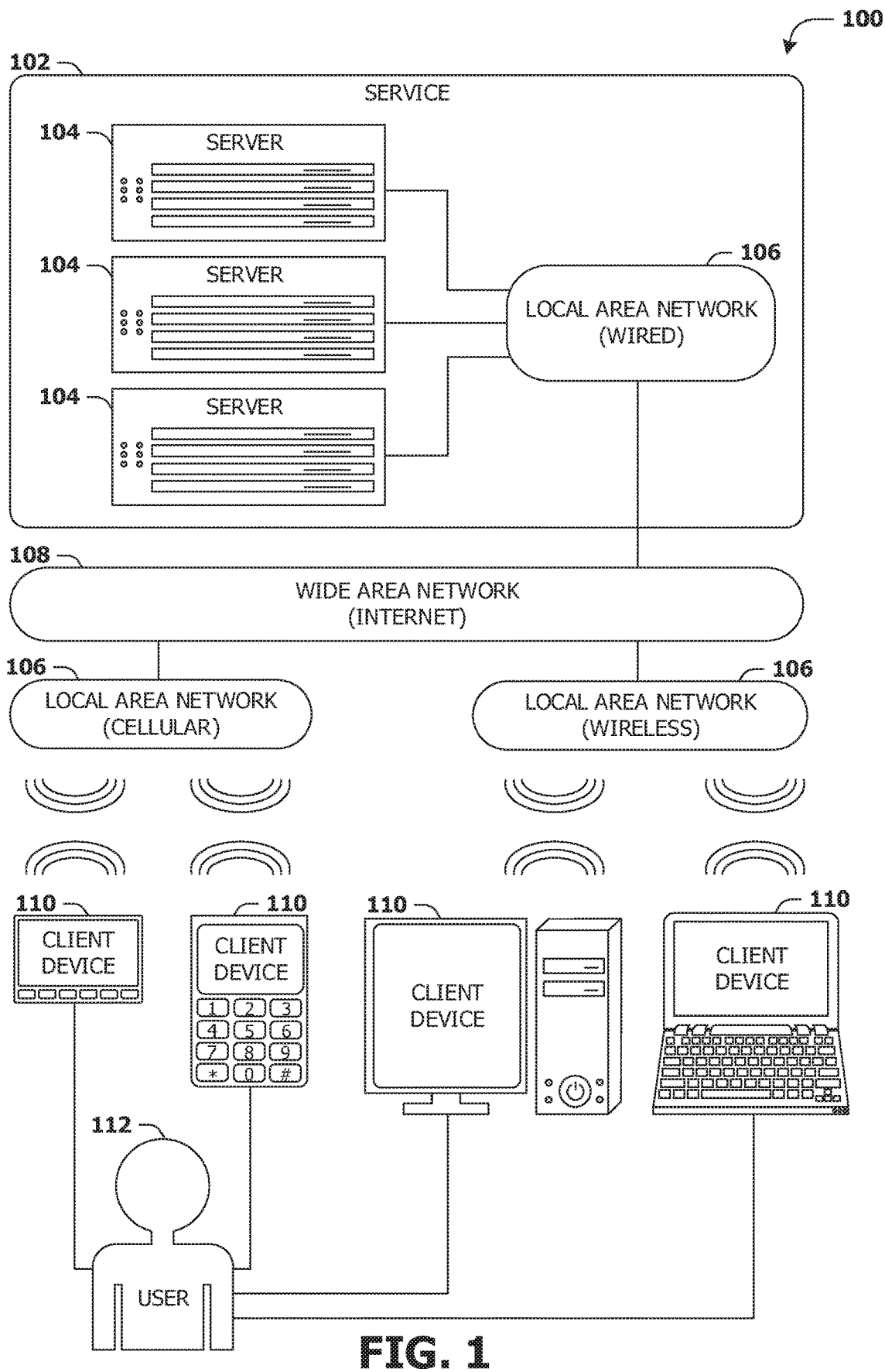
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
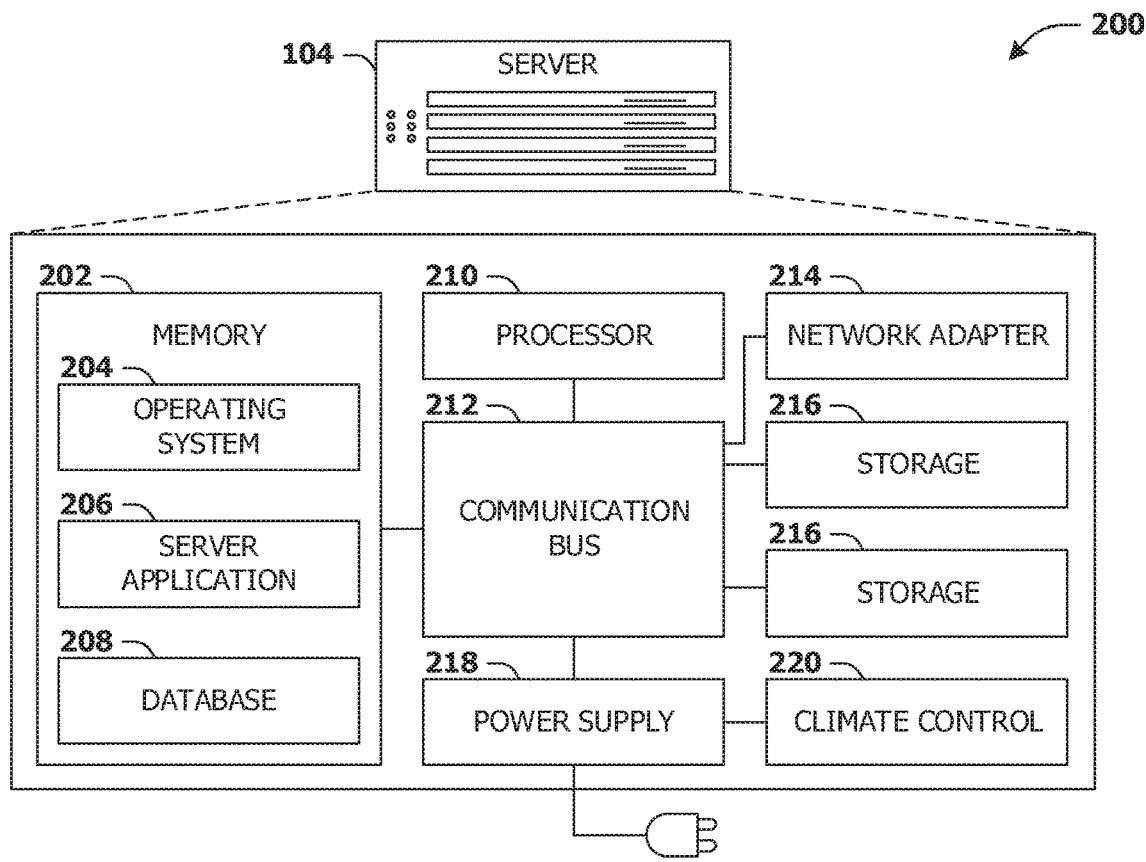
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
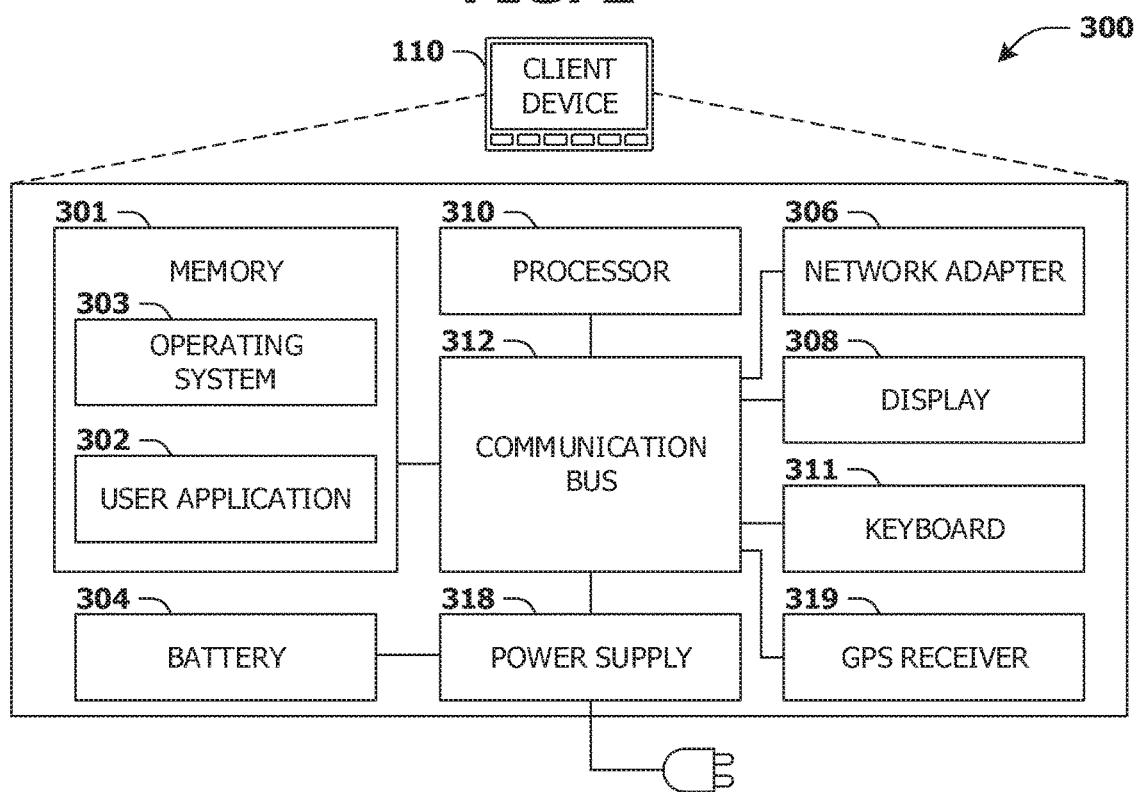
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting time-lapse videos and/or live-stream videos are provided. For example, a user may access and/or interact with a website, an application, etc. that provides a platform for viewing and/or downloading videos from a server (e.g., of the website, the application, etc.). The website and/or the application may comprise a video-sharing platform, a social media network, etc. The videos may comprise time-lapse videos and/or live-stream videos. A time-lapse video comprising a representation of a faster-moving version of a video (e.g., within which time appears to be moving faster than normal) may assist a user in viewing, understanding and/or determining a significance of the video. A server and/or a client device may receive a request to generate the time-lapse video. The time-lapse video may be generated without frame dropping (e.g., a drop-less time-lapse video) by identifying sets of video frames from the video and combining each of the sets of video frames to generate time-lapse video frames without dropping video frames of the video. Accordingly, the time-lapse video may be presented with minimal (e.g., and/or reduced, relative to techniques that drop video frames) choppiness and/or skips. Further, the time-lapse video may be generated to comprise a representation of the video (e.g., and/or time within the video) moving at a variable speed changing amongst a plurality of speeds by determining specific numbers of video frames (e.g., window sizes) comprised within each of the sets of video frames, wherein each speed of the plurality of speeds is based upon the specific numbers of video frames in the set of video frames that corresponds to that speed.

A live-stream video corresponding to a live event may be broadcast on the website, the application, etc. A recorded video (e.g., video on demand, recap video, etc.) of the live event may be stored in a memory structure. A time-lapse video (e.g., representing a faster moving version of the recorded video) may be presented ending with a presentation of a last time-lapse video frame. Responsive to a completion of the presenting the time-lapse video, the live-stream video may be presented beginning with a first live-stream video frame, wherein the first live-stream video frame represents a continuation of the last time-lapse video frame. Accordingly, the first live-stream video frame may be displayed following the last time-lapse video frame representing a (e.g., seamless) transition from the time-lapse video to the live-stream video.

Figure 4A:
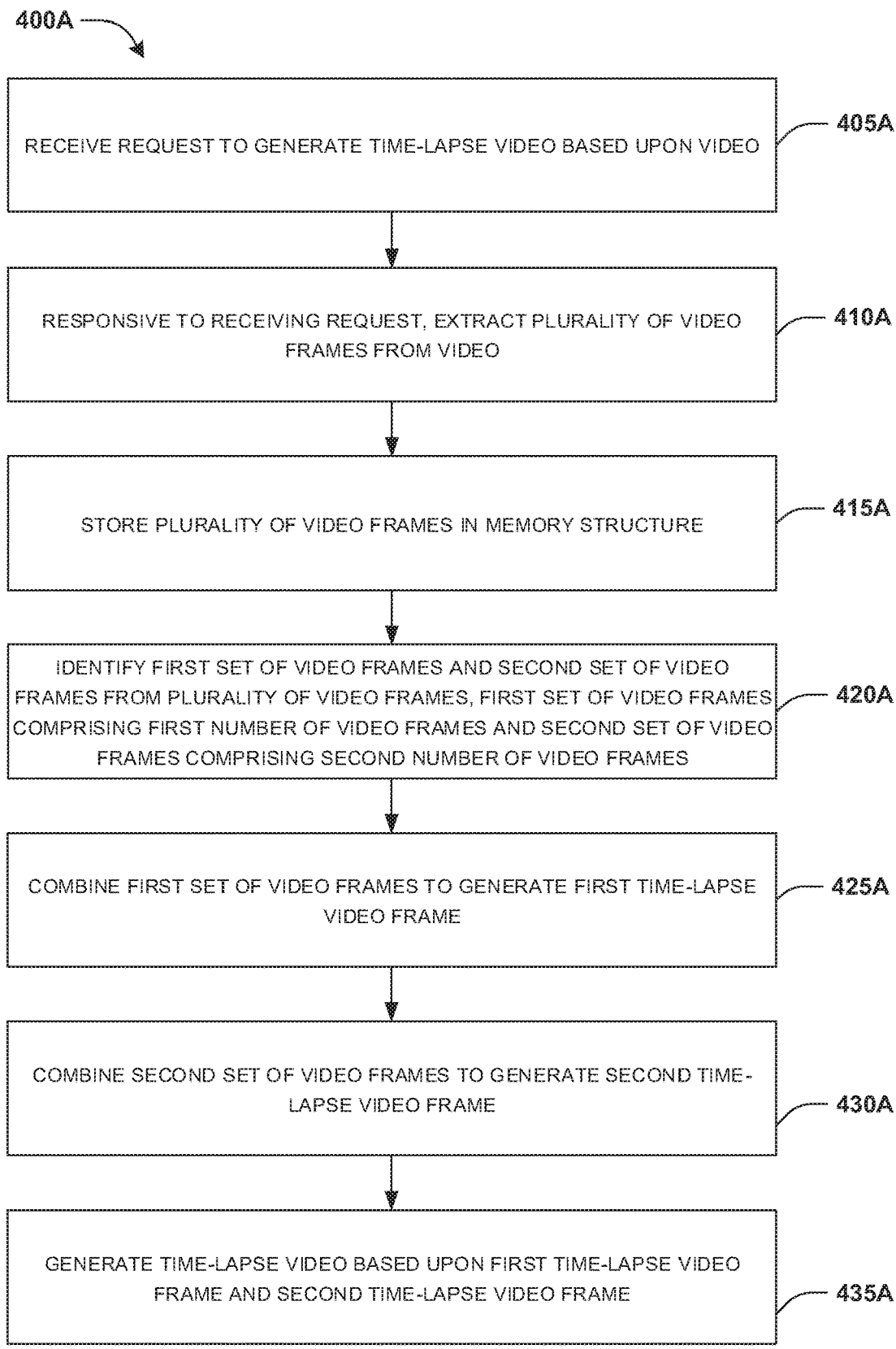
FIG. 4A is a flow chart illustrating an example method for generating a time-lapse video.

An embodiment of generating a time-lapse video is illustrated by an example method 400A of FIG. 4A. A user, such as user Jill, (e.g., and/or a client device) may access and/or interact with a website, an application, etc. that provides a platform for viewing and/or downloading videos from a server (e.g., of the website, the application, etc.). In some examples, the videos may comprise time-lapse videos. A time-lapse video may be based upon a video, wherein the time-lapse video may comprise a representation of a (e.g., visually) faster-moving version of the video (e.g., wherein time may appear to be moving faster than in the original video). Accordingly, at 405A, a request to generate a time-lapse video based upon a video may be received (e.g., by a server and/or the client device). For example, an administrator of the website, the application, etc., the user and/or the client device may transmit the request (e.g., to the server and/or the client device).

At 410A, responsive to receiving the request, a plurality of video frames may be extracted from the video (e.g., by the server and/or the client device). A number of the plurality of video frames extracted may be dependent upon a frame rate and/or a length of the video. At 415A, the plurality of video frames may be stored in a memory structure (e.g., cache memory and/or a different type of memory). At 420A, a first set of video frames and a second set of video frames may be identified (e.g., by the server and/or the client device) from the plurality of video frames wherein the first set of video frames may comprise a first number of video frames and the second set of video frames may comprise a second number of video frames. The first set of video frames may be overlapping with the second set of video frames such that the first set of video frames comprises one or more video frames that are also in the second set of video frames.

In some examples, the first number of video frames is equal to the second number of video frames. Alternatively and/or additionally, the first number of video frames is not equal to the second number of video frames. The first number of video frames may be determined based upon a first value identified in a window size data structure. Alternatively and/or additionally, the second number of video frames may be based upon a second value identified in the window size data structure. Alternatively and/or additionally, the first number of video frames and the second number of video frames may be determined based upon the first value.

In some examples, the window size data structure may be generated based upon the video (e.g., by the server and/or the client device). The video may be analyzed (e.g., by the server and/or the client device). For example, the window size data structure may be based upon a frame rate of the video, a time length of the video, a type of the video (e.g., landscape, sky, nature, game, sports, news, etc.), an amount of action in the video, a speed of movement in the video, etc. For example, the video may have a first frame rate and a second video may have a second frame rate. The first frame rate may be greater than the second frame rate. Accordingly, an average of values stored in the window size data structure (e.g., of the video) may be greater than (e.g., or less than) a second average of values stored in a second window size data structure of the second video.

In some examples, at 425A, the first set of video frames may be combined to generate a first time-lapse video frame. In some examples, the first set of video frames may be combined by averaging the first set of video frames. For example, pixels (e.g., and/or pixel values corresponding to the pixels) of the first set of video frames may be averaged to generate a first plurality of averaged pixels corresponding to the first time-lapse video frame. In some examples, at 430A, the second set of video frames may be combined to generate a second time-lapse video frame. In some examples, the second set of video frames may be combined by averaging the second set of video frames. For example, pixels (e.g., and/or pixel values corresponding to the pixels) of the second set of video frames may be averaged (e.g., with corresponding pixels of the second set of video frames) to generate a second plurality of averaged pixels corresponding to the second time-lapse video frame.

At 435A, the time-lapse video may be generated (e.g., by the server and/or the client device) based upon the first time-lapse video frame and the second time-lapse video frame. For example, the time-lapse video may be generated by compiling a plurality of time-lapse video frames comprising the first time-lapse video frame and the second time-lapse video frame (e.g., and/or one or more generated time-lapse video frames corresponding to other combinations of sets of video frames of a plurality of sets of video frames identified from the plurality of video frames extracted from the video). Accordingly, the time-lapse video may comprise a representation of the first time-lapse video frame and the second time-lapse video frame (e.g., and/or the one or more generated time-lapse video frames). Accordingly, the website, the application, etc. may provide a platform for displaying and/or viewing (e.g., and/or downloading) the time-lapse video (e.g., displaying and/or viewing the first time-lapse video frame, the second time-lapse video frame and/or one or more generated time-lapse video frames, consecutively).

In some examples, a curve corresponding to the window size data structure may be generated (e.g., by the server and/or the client device) based upon an analysis of the video. The curve may correspond to a plurality of numbers of video frames (e.g., a plurality of window sizes) associated with (e.g., the plurality of sets of video frames corresponding to) the plurality of time-lapse video frames. In some examples, the window size data structure may be generated based upon the curve.

In some examples, the window size data structure may comprise a plurality of values corresponding to the plurality of numbers of video frames associated with (e.g., the plurality of sets of video frames corresponding to) the plurality of time-lapse video frames. In some examples, (e.g., each of) the plurality of values may be linked with a plurality of identifiers that (e.g., each) identify one or more sets of video frames of the plurality of sets of video frames. For example, a value of the plurality of values may be linked with an identifier that identifies a (e.g., single) set of video frames of the plurality of sets of video frames corresponding to the plurality of time-lapse video frames. Accordingly, the value of the plurality of values may correspond to a number of video frames associated with a (e.g., single) set of video frames of the plurality of sets of video frames corresponding to the plurality of time-lapse video frames. Alternatively and/or additionally, a value of the plurality of values may be linked with an identifier that identifies a portion (e.g., more than one) of the plurality of sets of video frames corresponding to the plurality of time-lapse video frames. Accordingly, the value of the plurality of values may correspond to a number of video frames associated with the portion (e.g., more than one) of the plurality of sets of video frames corresponding to the plurality of time-lapse video frames.

In an example, a third number of video frames may be determined (e.g., by the server and/or the client device) based upon a third value identified in the window size data structure. Alternatively and/or additionally, a fourth number of video frames may be determined based upon a fourth value identified in the window size data structure. Alternatively and/or additionally, a fifth number of video frames may be determined based upon a fifth value identified in the window size data structure. Accordingly, a first plurality of sets of video frames corresponding to the third number of video frames may be identified (e.g., by the server and/or the client device) from the plurality of video frames (e.g., wherein each of the first plurality of sets of video frames comprises the third number of video frames). Alternatively and/or additionally, a second plurality of sets of video frames corresponding to the fourth number of video frames may be identified from the plurality of video frames. Alternatively and/or additionally, a third plurality of sets of video frames corresponding to the fifth number of video frames may be identified from the plurality of video frames.

The first plurality of sets of video frames may (e.g., each) be combined (e.g., averaged) (e.g., by the server and/or the client device) to generate a first plurality of time-lapse video frames. Alternatively and/or additionally, the second plurality of sets of video frames may (e.g., each) be combined (e.g., averaged) to generate a second plurality of time-lapse video frames. Alternatively and/or additionally, the third plurality of sets of video frames may (e.g., each) be combined (e.g., averaged) to generate a third plurality of time-lapse video frames.

In some examples, the time-lapse video may be generated (e.g., by the server and/or the client device) based upon the first plurality of time-lapse video frames, the second plurality of time-lapse video frames and the third plurality of time-lapse video frames. Accordingly, the time-lapse video may comprise a representation of first plurality of time-lapse video frames, the second plurality of time-lapse video frames and the third plurality of time-lapse video frames. Accordingly, the website, the application, etc. may provide a platform for displaying and/or viewing (e.g., and/or downloading) a first portion of the time-lapse video comprising the first plurality of time-lapse video frames, a second portion of the time-lapse video comprising the second plurality of time-lapse video frames and a third portion of the time-lapse video comprising the third plurality of time-lapse video frames, consecutively. Accordingly, the second portion of the time-lapse video may be displayed after the first portion of the time-lapse video and the third portion of the time-lapse video may be displayed after the second portion of the time-lapse video.

In some examples, the third number of video frames (e.g., corresponding to the first plurality of time-lapse video frames) may be less than the fourth number of video frames (e.g., corresponding to the second plurality of time-lapse video frames) and the fifth number of video frames (e.g., corresponding to the third plurality of time-lapse video frames) may be less than the fourth number of video frames. Accordingly, the first portion of the time-lapse video may comprise a representation of a first portion of the video at a first speed (e.g., rate of the time-lapse video compared to the video). Alternatively and/or additionally, the second portion of the time-lapse video may comprise a representation of a second portion of the video at a second speed. Alternatively and/or additionally, the third portion of the time-lapse video may comprise a representation of a third portion of the video at a third speed. In some examples, the first speed may be less than the second speed and the third speed may be less than the second speed. Accordingly, the time-lapse video may begin with a representation of the first portion of the video at the first speed. The time-lapse video may comprise a representation of the second portion of the video at the second speed (e.g., increase speed) following the first portion of the video corresponding to the first speed. The time-lapse video may comprise a representation of the third portion of the video at the third speed (e.g., decrease speed) following the second portion of the video corresponding to the second speed.

In some examples, the time-lapse video may comprise a plurality of portions (e.g., each) corresponding to a plurality of speeds. For example, the time-lapse video may comprise a representation of a faster-moving version of the video comprising the plurality of portions representing shifts in speed. For example, the plurality of speeds may increase and/or the plurality of speeds may decrease based upon the window size data structure. The time-lapse video may comprise a representation of the video moving at a variable speed, the variable speed changing amongst the plurality of speeds. The variable speed may increase and/or decrease. In some examples, the variable speed may (e.g., gradually) increase throughout the time-lapse video. Alternatively and/or additionally, the variable speed may (e.g., gradually) decrease throughout the time-lapse video. Alternatively and/or additionally, the variable speed may (e.g., gradually) increase before (e.g., gradually) decreasing throughout the time-lapse video.

Figure 4B:
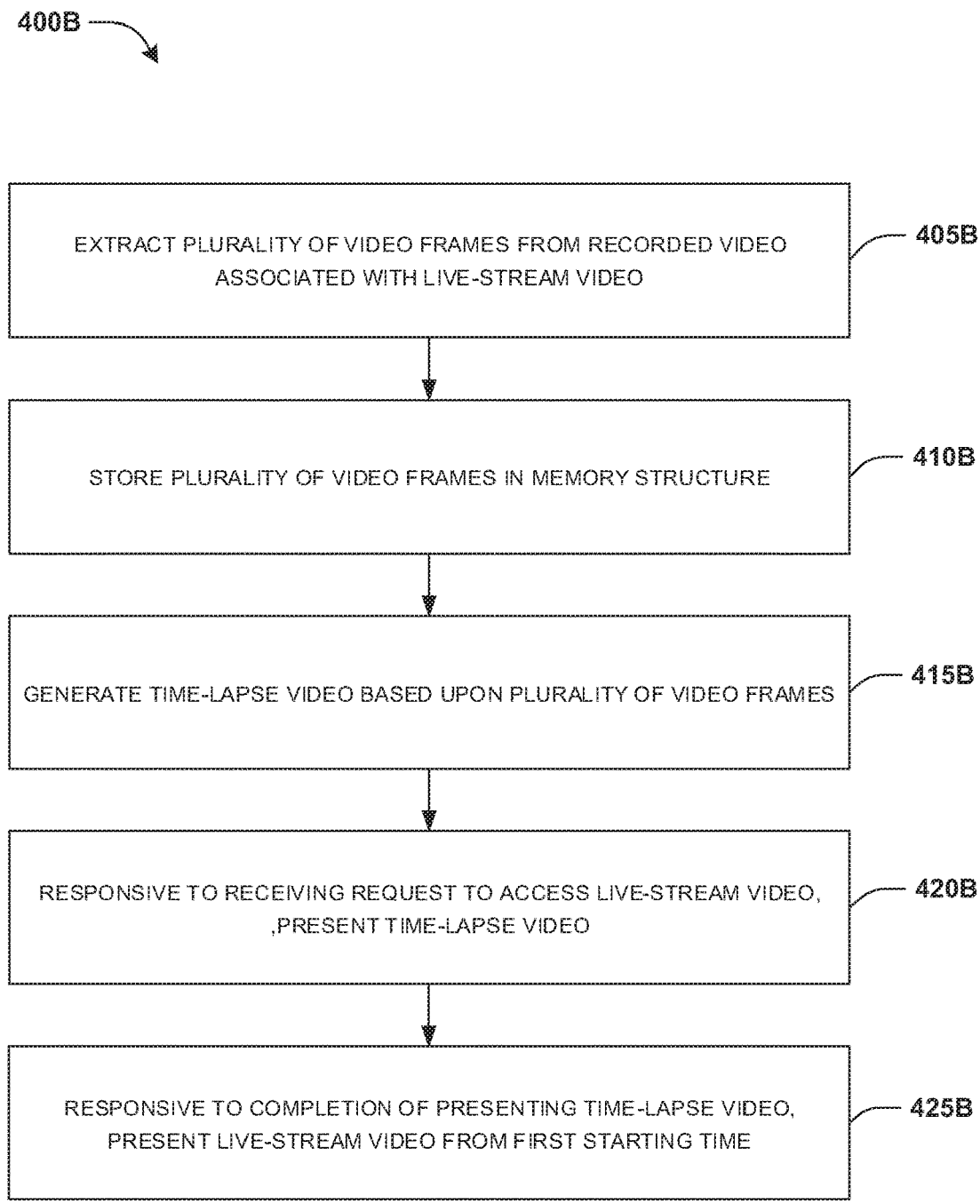
FIG. 4B is a flow chart illustrating an example method for presenting a live-stream video.

An embodiment of presenting a live-stream video is illustrated by an example method 400B of FIG. 4B. A website, an application, etc. may provide a platform for displaying and/or viewing (e.g., and/or downloading) live-stream videos from a server (e.g., of the website, the application, etc.) in order to broadcast live events (e.g., performances, video-games, games, sports, etc.) in real time. A live-stream video may be broadcast at a time corresponding to a live event. For example, the live event may be recorded (e.g., using a video recorder) to broadcast the live-stream video in real time. Accordingly, the live-stream video may be broadcast beginning at a first time corresponding to a beginning of the live event.

In some examples, a recorded video (e.g., video on demand, recap video, etc.) of the live event may be stored in a memory structure. For example, the recorded video may comprise a representation of the live event. Accordingly, at a second time after the first time, the recorded video may comprise a representation of the live event from the first time (e.g., the beginning of the live event) to the second time (e.g., a point in time during the live event). Alternatively and/or additionally, at a third time different from the second time, a second version of the recorded video may comprise a representation of the live event from the first time to the third time (e.g., a point in time during the live event).

In some examples, a time-lapse video may be generated based upon the recorded video (e.g., comprising a representation of the live event from the first time to the second time), wherein the time-lapse video may comprise a representation of a faster-moving version of the recorded video. Accordingly, at 405B, a plurality of video frames may be extracted from the recorded video associated with the live-stream video (e.g., of the live event). A number of the plurality of video frames may be dependent upon a frame rate and/or a length of the recorded video. At 410B, the plurality of video frames may be stored in a memory structure (e.g., cache memory and/or a different type of memory). One or more sets of video frames may (e.g., then) be identified (e.g., by the server and/or the client device) corresponding to one or more numbers of video frames. The one or more numbers may be based upon one or more values identified in a window size data structure. In some examples, (e.g., each of) the one or more sets of video frames may be combined (e.g., averaged) to generate one or more time-lapse video frames. Accordingly, at 415B, the time-lapse video may be generated (e.g., by the server and/or the client device) based upon the plurality of video frames. For example, the time-lapse video may be generated by compiling the one or more time-lapse video frames. Accordingly, the time-lapse video may comprise a representation of the one or more time-lapse video frames. Accordingly, the website, the application, etc. may provide a platform for displaying and/or viewing (e.g., and/or downloading) the time-lapse video (e.g., displaying and/or viewing the one or more time-lapse video frames, consecutively).

A user, such as user Jill, (e.g., and/or a client device) may access and/or interact with the website, the application, etc. to view (e.g., and/or download) one or more live-stream videos. The user (e.g., and/or the client device) may transmit a request to access the live-stream video at a fourth time corresponding to the second time. The fourth time may follow the second time by a specific length of time (e.g., zero seconds, 1 second, two seconds, four seconds, eight seconds, 800 seconds, etc.). Alternatively and/or additionally, the fourth time may be followed by the second time by the specific length of time. Accordingly, at 420B, responsive to receiving the request to access the live-stream video (e.g., by the server and/or the client device), the time-lapse video may be presented. In some examples, the website, the application, etc. may provide a platform for displaying and/or viewing (e.g., and/or downloading) the time-lapse video. Accordingly, the one or more time-lapse video frames may be displayed (e.g., consecutively). In some examples, the plurality of video frames may end with a last video frame. The one or more time-lapse video frames may end with a last time-lapse video frame representing the last video frame.

At 425B, responsive to a completion of the presenting the time-lapse video (e.g., ending with a presentation of the last time-lapse video frame), the live-stream video may be presented from a first starting time (e.g., a current and/or live time). The live-stream video may begin with a first live-stream video frame. In some examples, the first live-stream video frame may represent a continuation of the last video frame. Accordingly, the first live-stream video frame may be displayed (e.g., immediately) following the last time-lapse video frame at the first starting time representing a (e.g., seamless) transition from the time-lapse video to the live-stream video.

In some examples, a second time-lapse video may be generated based upon the second version of the recorded video, (e.g., comprising a representation of the live event from the first time to the third time instead of the second time) wherein the time-lapse video may comprise a representation of a faster-moving version of the second version of the recorded video.

A second user, such as user Jack, (e.g., and/or a second client device) may access and/or interact with the website, the application, etc. to view (e.g., and/or download) one or more live-stream videos. The second user (e.g., and/or the second client device) may transmit a request to access the live-stream video at a fifth time corresponding to the third time. Accordingly, responsive to receiving the request to access the live-stream video, the second time-lapse video may be presented. In some examples, the website, the application, etc. may provide a platform for displaying and/or viewing (e.g., and/or downloading) the second time-lapse video. The second time-lapse video may end with a second last time-lapse video frame.

In some examples, responsive to a completion of the presenting the second time-lapse video (e.g., ending with a presentation of the second last time-lapse video frame) the live-stream video may be presented from a second starting time (e.g., a current and/or live time). The live-stream video may begin with a second live-stream video frame. In some examples, the second live-stream video frame may represent a continuation of the second last video frame. Accordingly, the second live-stream video frame may be displayed (e.g., immediately) following the second last time-lapse video frame at the second starting time representing a (e.g., seamless) transition from the second time-lapse video to the live-stream video.

In some examples, a plurality of time-lapse videos may be generated (e.g., by the server and/or the client device) at a plurality of times corresponding to a plurality of starting times of the live-stream video. A time-length between (e.g., each of) the plurality of times may be fixed or variable. For example, the time-length may be one second, two seconds, four seconds, 400 seconds, etc. In some examples, an updated time-lapse video may be generated for the live-stream video periodically. Accordingly, a unique time-lapse video of the plurality of time-lapse videos may be generated every one second, two seconds, four seconds, 400 seconds, etc. In some examples, an updated time-lapse video may be generated for the live-stream video in response to receiving a request (e.g., from a user, to view the live-stream video).

For example, a third time-lapse video of the plurality of time-lapse videos may be generated. The third time-lapse video may correspond to a third starting time of the live-stream video. Accordingly, a third user may transmit a request to access the live-stream video. Responsive to receiving the request to access the live-stream video, the third time-lapse video may be presented. In some examples, responsive to a completion of the presenting the third time-lapse video (e.g., ending with a presentation of a third last time-lapse video frame), the live-stream video may be presented from a third starting time. The live-stream video may begin with a third live-stream video frame. In some examples, the third live-stream video frame may represent a continuation of the third last video frame. Accordingly, the third live-stream video frame may be displayed following the third last time-lapse video frame at the third starting time representing a (e.g., seamless) transition from the third time-lapse video to the live-stream video.

Figure 5:
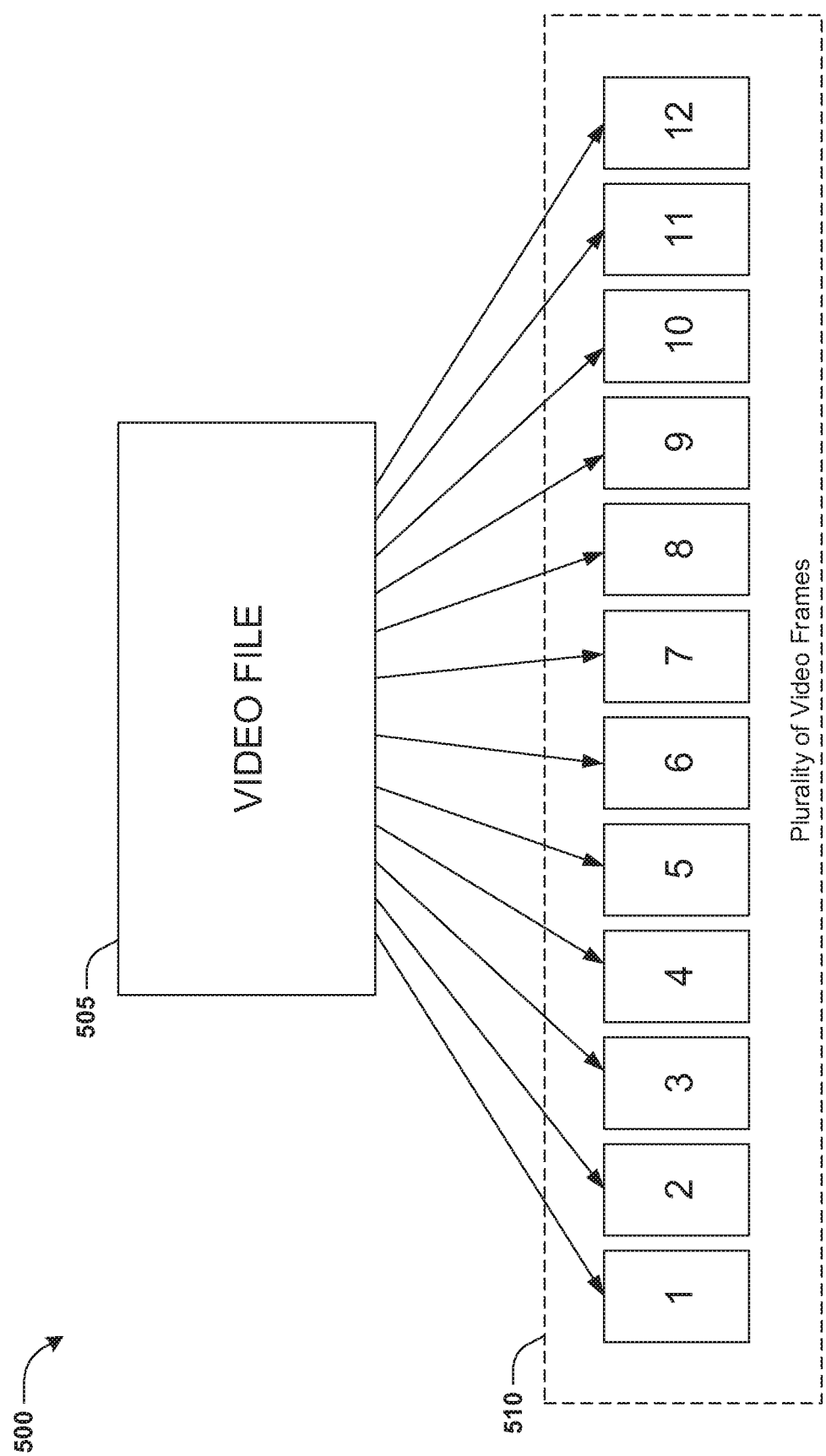
FIG. 5 is a component block diagram illustrating an example system for extracting a plurality of video frames from a video file.

FIG. 5 illustrates a system 500 for extracting a plurality of video frames 510 from a video file 505. A user, such as user Jill, (e.g., and/or a client device) may access and/or interact with a website, an application etc. that provides a platform for viewing and/or downloading videos from a server (e.g., of the website, the application, etc.). In some examples, the videos may comprise time-lapse videos. A time-lapse video may comprise a representation of a faster-moving version of the video file 505. Accordingly, a request to generate a time-lapse video based upon the video file 505 may be received (e.g., by a server and/or the client device). For example, an administrator of the website, the application, etc., the user and/or the client device may transmit the request (e.g., to the server and/or to the client device).

In some examples, responsive to receiving the request, the plurality of video frames 510 may be extracted from the video file 505 (e.g., by the server and/or the client device). A number of the plurality of video frames extracted may be dependent upon a frame rate and/or a length of the video. In some examples, the plurality of video frames 510 may be stored in a memory structure (e.g., cache memory and/or a different type of memory).

Figure 6:
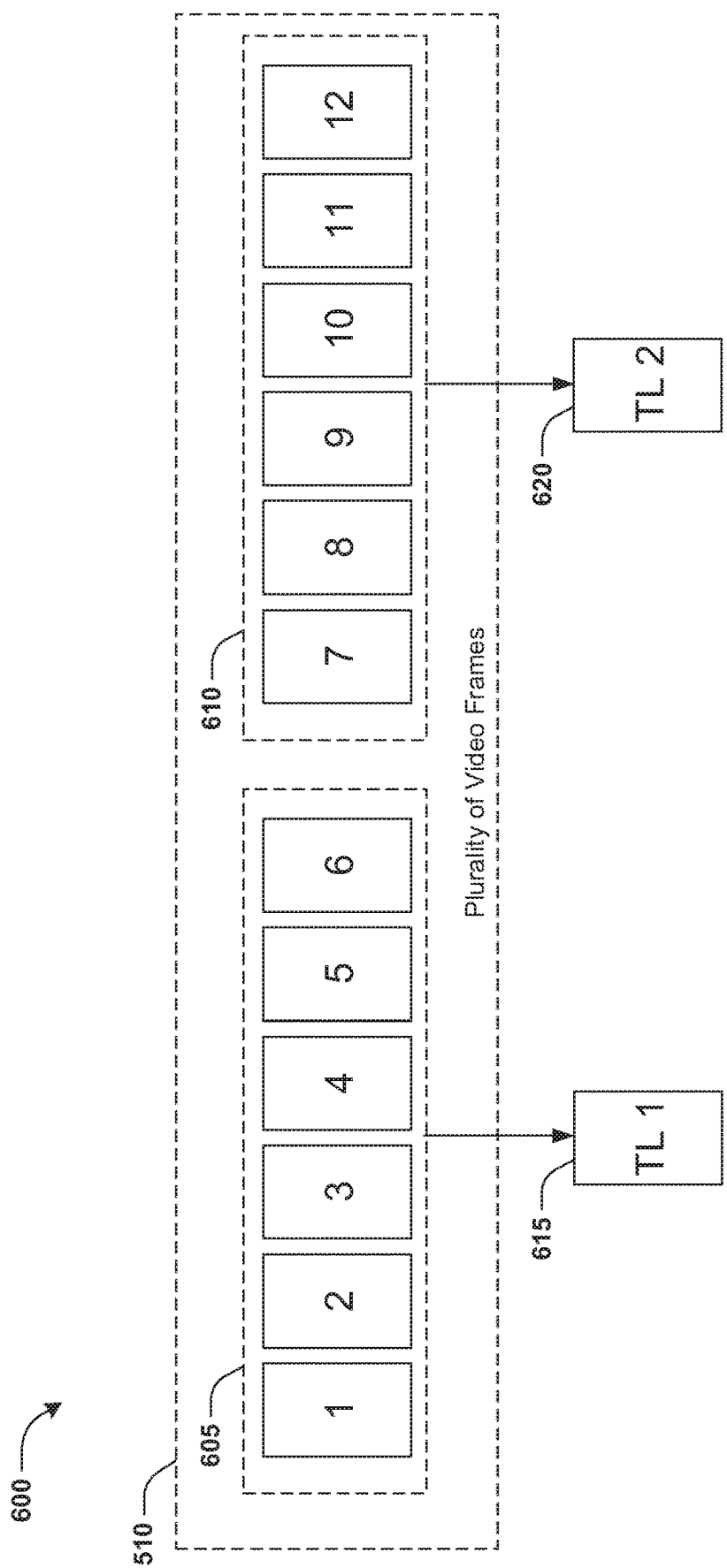
FIG. 6 is a component block diagram illustrating an example system for generating a first time-lapse video frame and a second time-lapse video frame based upon a first set of video frames and a second set of video frames wherein the first set of video frames and the second set of video frames are not overlapping.

FIG. 6 illustrates a system 600 for generating a first time-lapse video frame 615 and a second time-lapse video frame 620 based upon a first set of video frames 605 and a second set of video frames 610 wherein the first set of video frames 605 and the second set of video frames 610 are not overlapping. In some examples, the first set of video frames 605 and the second set of video frames 610 may be identified (e.g., by the server and/or the client device) from the plurality of video frames 510. In some examples, the first set of video frames 605 is not overlapping with the second set of video frames 610 such that the first set of video frames 605 does not comprise (e.g., any) video frames that are also in the second set of video frames 610.

In some examples, the first set of video frames 605 may comprise a first number of video frames and the second set of video frames 610 may comprise a second number of video frames. In some examples, the first number of video frames (e.g., six) is equal to the second number of video frames (e.g., six). Alternatively and/or additionally, the first number of video frames is not equal to the second number of video frames. The first number of video frames may be determined based upon a first value identified in a window size data structure. Alternatively and/or additionally, the second number of video frames may be based upon a second value identified in the window size data structure. Alternatively and/or additionally, the first number of video frames and the second number of video frames may be determined based upon the first value.

In some examples, the first set of video frames 605 may be combined to generate the first time-lapse video frame 615. The first set of video frames 605 may be combined by averaging the first set of video frames 605. For example, pixels (e.g., and/or pixel values corresponding to the pixels) of the first set of video frames 605 may be averaged to generate a first plurality of averaged pixels corresponding to the first time-lapse video frame 615. In some examples, the second set of video frames 610 may be combined to generate the second time-lapse video frame 620. The second set of video frames 610 may be combined by averaging the second set of video frames 610. For example, pixels (e.g., and/or pixel values corresponding to the pixels) of the second set of video frames 610 may be averaged to generate a second plurality of averaged pixels corresponding to the second time-lapse video frame 620.

Figure 7:
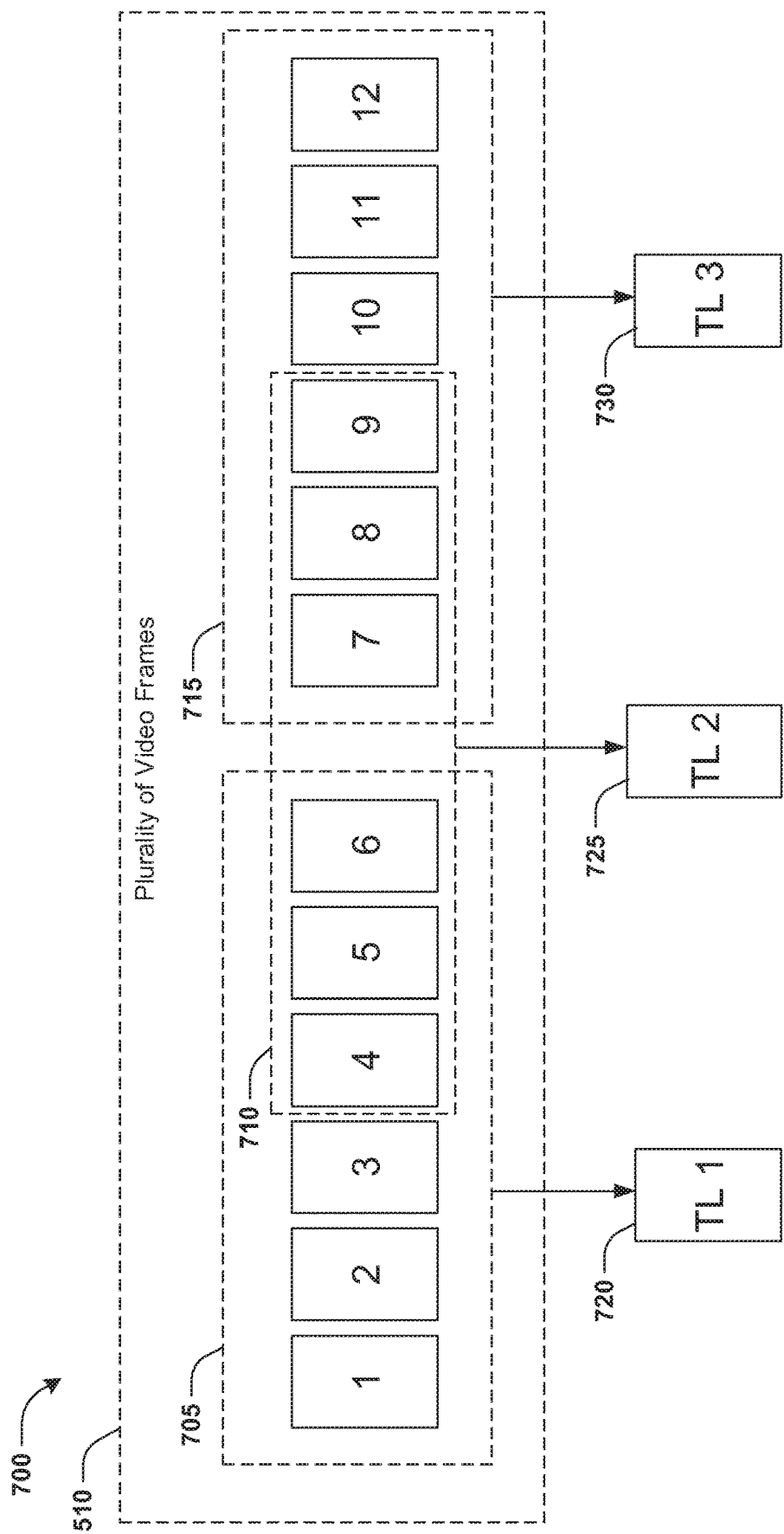
FIG. 7 is a component block diagram illustrating an example system for generating a first time-lapse video frame, a second time-lapse video frame and a third time-lapse video frame based upon a first set of video frames, a second set of video frames and a third set of video frames wherein the first set of video frames and the second set of video frames are overlapping and the second set of video frames and the third set of video frames are overlapping.

FIG. 7 illustrates a system 700 for generating a first time-lapse video frame 720, a second time-lapse video frame 725 and a third time-lapse video frame 730 based upon a first set of video frames 705, a second set of video frames 710 and a third set of video frames 715 wherein the first set of video frames 705 and the second set of video frames 710 are overlapping and the second set of video frames 710 and the third set of video frames 715 are overlapping. In some examples, the first set of video frames 705, the second set of video frames 710 and the third set of video frames 715 may be identified (e.g., by the server and/or the client device) from the plurality of video frames 510. In some examples, the first set of video frames 705 may overlap with the second set of video frames 710 such that the first set of video frames 705 comprises video frames that are also in the second set of video frames 710. Alternatively and/or additionally, the second set of video frames 710 may overlap with the third set of video frames 715 such that the second set of video frames 710 comprises video frames that are also in the third set of video frames 715.

In some examples, the first set of video frames 705 may be combined to generate the first time-lapse video frame 720. The first set of video frames 705 may be combined by averaging the first set of video frames 705. For example, pixels (e.g., and/or pixel values corresponding to the pixels) of the first set of video frames 705 may be averaged to generate a first plurality of averaged pixels corresponding to the first time-lapse video frame 720. In some examples, the second set of video frames 710 may be combined to generate the second time-lapse video frame 725. The second set of video frames 710 may be combined by averaging the second set of video frames 710. For example, pixels (e.g., and/or pixel values corresponding to the pixels) of the second set of video frames 710 may be averaged to generate a second plurality of averaged pixels corresponding to the second time-lapse video frame 725. In some examples, the third set of video frames 715 may be combined to generate the third time-lapse video frame 730. The third set of video frames 715 may be combined by averaging the third set of video frames 715. For example, pixels (e.g., and/or pixel values corresponding to the pixels) of the third set of video frames 715 may be averaged to generate a third plurality of averaged pixels corresponding to the third time-lapse video frame 730.

Figure 8:
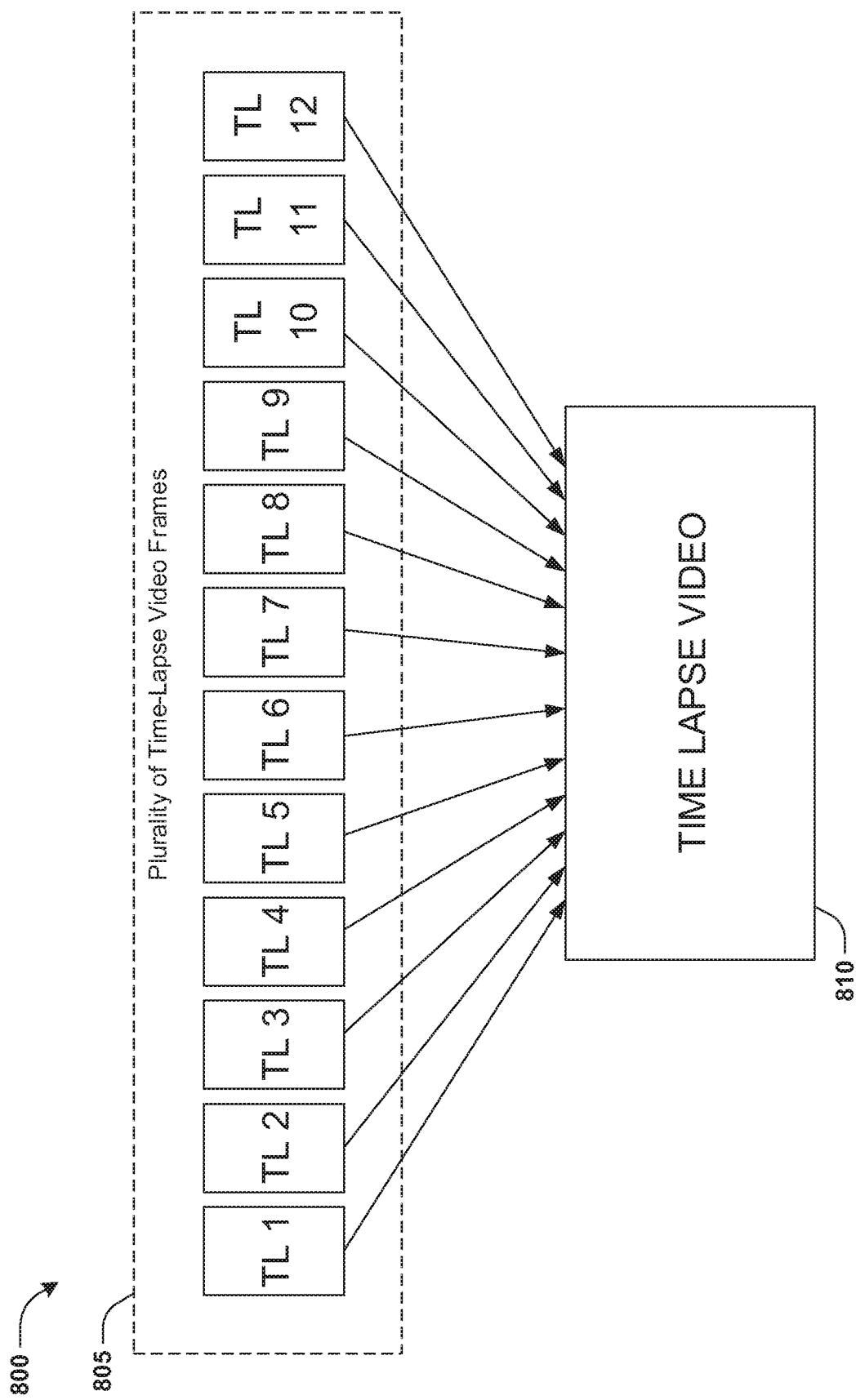
FIG. 8 is a component block diagram illustrating an example system for generating a time-lapse video based upon a plurality of time-lapse video frames.

FIG. 8 illustrates a system 800 for generating a time-lapse video 810 based upon a plurality of time-lapse video frames 805. In some examples, the plurality of time-lapse video frames 805 may be generated based upon a plurality of video frames extracted from the video file 505. In some examples, the time-lapse video 810 may be generated (e.g., by the server and/or the client device) based upon the plurality of time-lapse video frames 805. For example, the time-lapse video 810 may be generated by compiling the plurality of time-lapse video frames 805. Accordingly, the time-lapse video 810 may comprise a representation of the plurality of time-lapse video frames 805. Accordingly, the website, the application, etc. may provide a platform for displaying and/or viewing (e.g., and/or downloading) the time-lapse video 810 (e.g., displaying and/or viewing the plurality of time-lapse video frames 805, consecutively).

FIG. 9A illustrates a system 900A for generating a window size data structure 905A wherein the window size data structure 905A comprises a plurality of window size values that (e.g., each) may be linked with an identifier that identifies a (e.g., single) set of video frames of a plurality of sets of video frames corresponding to the plurality of time-lapse video frames 805. For example, a first window size value 1 may be linked with an identifier 1 that identifies a first set of video frames of the plurality of sets of video frames. Accordingly, the first set of video frames may comprise one video frame (e.g., of the plurality of video frames 510). A second window size value 1 may be linked with an identifier 2 that identifies a second set of video frames of the plurality of sets of video frames. Accordingly, the second set of video frames may comprise one video frame (e.g., of the plurality of video frames 510). A third window size value 2 may be linked with an identifier 3 that identifies a third set of video frames of the plurality of sets of video frames. Accordingly, the third set of video frames may comprise two video frames (e.g., of the plurality of video frames 510).

FIG. 9B illustrates a system 900B for generating a window size data structure 905B wherein the window size data structure 905B comprises a plurality of window size values that (e.g., each) may be linked with an identifier that identifies a portion (e.g., more than one) of a plurality of sets of video frames corresponding to the plurality of time-lapse video frames 805. For example, a first window size value 1 may be linked with an identifier 1-2 that identifies a first set of video frames and a second set of video frames of the plurality of sets of video frames. Accordingly, the first set of video frames and the second set of video frames may (e.g., each) comprise one video frame (e.g., of the plurality of video frames 510). A second window size value 2 may be linked with an identifier 3-10 that identifies eight sets of video frames of the plurality of sets of video frames. Accordingly, the eight sets of video frames may (e.g., each) comprise two video frames (e.g., of the plurality of video frames 510). A third window size value 8 may be linked with an identifier 11-20 that identifies ten sets of video frames of the plurality of sets of video frames. Accordingly, the ten sets of video frames may (e.g., each) comprise eight video frames (e.g., of the plurality of video frames 510).

Figure 10:
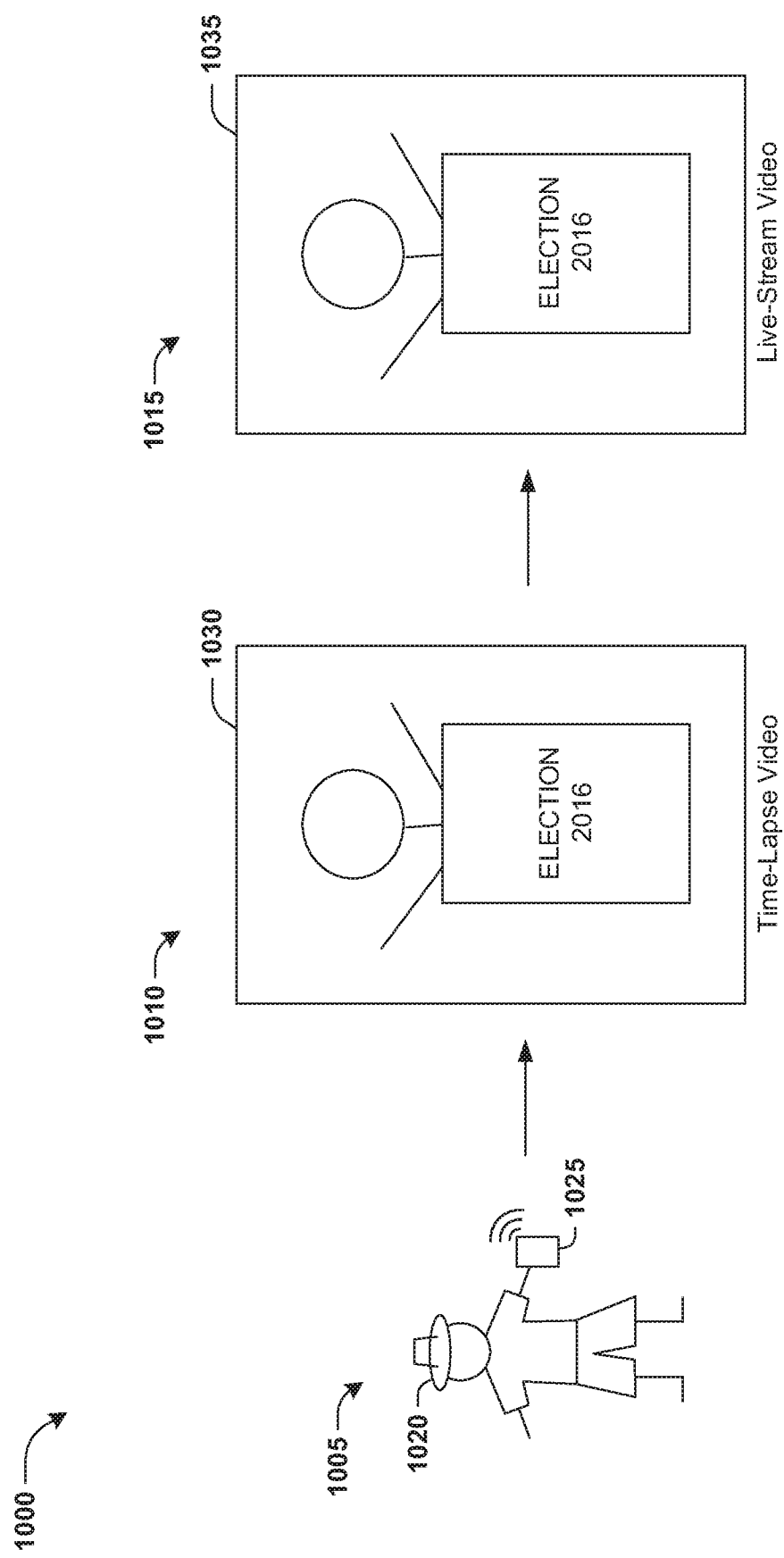
FIG. 10 is a component block diagram illustrating an example system for presenting a live-stream video.

FIG. 10 illustrates a system 1000 for presenting a live-stream video 1035. A website, an application, etc. may provide a platform for displaying and/or viewing (e.g., and/or downloading) live-stream videos from a server (e.g., of the website, the application, etc.) in order to broadcast live events (e.g., performances, video-games, games, sports, etc.) in real time. The live-stream video 1035 may be broadcast at a time corresponding to a live event beginning at a first time corresponding to a beginning of the live event. A recorded video (e.g., video on demand, recap video, etc.) of the live event may be stored in a memory structure. For example, the recorded video may comprise a representation of the live event. Accordingly, at a second time after the first time, the recorded video may comprise a representation of the live event from the first time (e.g., the beginning of the live event) to the second time (e.g., a point in time during the live event). In some examples, a time-lapse video 1030 may be generated based upon the recorded video (e.g., comprising a representation of the live event from the first time to the second time), wherein the time-lapse video may comprise a representation of a faster-moving version of the recorded video.

A user 1020 may access and/or interact with the website, the application, etc. to view (e.g., and/or download) one or more live-stream videos using a client device 1025 (e.g., a phone, a tablet, a computer, a laptop, a television, etc.). The user 1020 (e.g., and/or the client device 1025) may transmit a request to access the live-stream video 1035 at a first instance 1005 corresponding to the second time. The first instance may follow the second time by a specific length of time (e.g., zero seconds, 1 second, two seconds, four seconds, eight seconds, 800 seconds, etc.). Alternatively and/or additionally, the first instance may be followed by the second time by the specific length of time. Accordingly, responsive to receiving the request to access the live-stream video 1035 (e.g., by the server and/or the client device 1025), the time-lapse video 1030 may be presented at a second instance 1010. For example, the website, the application, etc. may provide a platform for displaying and/or viewing (e.g., and/or downloading) the time-lapse video at the second instance 1010. The time-lapse video 1030 may end with a last time-lapse video frame representing a last video frame of the recorded video.

In some examples, responsive to a completion of the presenting the time-lapse video 1030 (e.g., ending with a presentation of the last time-lapse video frame), the live-stream video 1035 may be presented at a third instance 1015. The live-stream video 1035 may begin with a first live-stream video frame. In some examples, the first live-stream video frame may represent a continuation of the last video frame. Accordingly, the first live-stream video frame may be displayed following the last time-lapse video frame at the third instance 1015 representing a (e.g., seamless) transition from the time-lapse video 1030 to the live-stream video 1035.

It may be appreciated that the disclosed subject matter may assist a user (e.g., and/or a device associated with the user) in viewing, understanding and/or determining a significance of a video via a time-lapse video corresponding to the video, wherein the time-lapse video comprises time-lapse video frames corresponding to combinations of sets of video-frames of the video.

Implementation of at least some of the disclosed subject matter may lead to benefits including, but not limited to, increased smoothness (e.g., decreased choppiness, decreased skips, etc.) of the time-lapse video and/or movement in the time-lapse video (e.g., as a result of determining numbers of video frames corresponding to the sets of video frames, as a result of identifying the sets of video frames and combining the sets of video frames to generate time-lapse video frames used to generate the time-lapse video, as a result of presenting the time-lapse video, etc.). Alternatively and/or additionally, implementation of at least some of the disclosed subject matter may lead to benefits including decreased frame dropping and/or no frame dropping of the time-lapse video (e.g., drop-less time-lapse video) (e.g., as a result of identifying the sets of video frames without dropping video frames of the video, as a result of combining the sets of video frames to generate the time-lapse video frames used to generate the time-lapse video, etc.). Alternatively and/or additionally, implementation of at least some of the disclosed subject matter may lead to benefits including a variably smooth time-lapse video (e.g., wherein the variable smooth time-lapse video may comprise a representation of the video moving at a variable speed changing amongst a plurality of speeds) (e.g., as a result of generating a window size data structure comprising a plurality of values corresponding to a plurality of numbers of video frames associated with a plurality of sets of video frames, as a result of the variable speed increasing throughout the time-lapse video, as a result of the variable speed decreasing throughout the time-lapse video, as a result of the variable speed increasing before decreasing throughout the time-lapse video, etc.).

Alternatively and/or additionally, implementation of at least some of the disclosed subject matter may lead to benefits including a smoother (e.g., seamless) transition from presenting a time-lapse video (e.g., representing a faster-moving version of a recorded video, a video on demand and/or a recap video) corresponding to a live-stream video to presenting the live-stream video (e.g., as a result of presenting the time-lapse video ending with a presentation of a last time-lapse video frame representing a last video frame of the recorded video, as a result of presenting the live-stream video beginning with a first live-stream video frame responsive to a completion of the presenting the time-lapse video, as a result of first live-stream video frame representing a continuation of the last video frame, etc.). Alternatively and/or additionally, implementation of at least some of the disclosed subject matter may lead to benefits including a personalized time-lapse video (e.g., wherein the time-lapse video may be based upon a time when the user and/or the device associated with the user transmits a request to access the live-stream video) (e.g., as a result of generating a plurality of time-lapse videos at a plurality of times related to a plurality of starting times of the live-stream video, as a result of presenting a unique time-lapse video corresponding to a time that the user and/or the device associated with the user transmits the request to access the live-stream video, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 11:
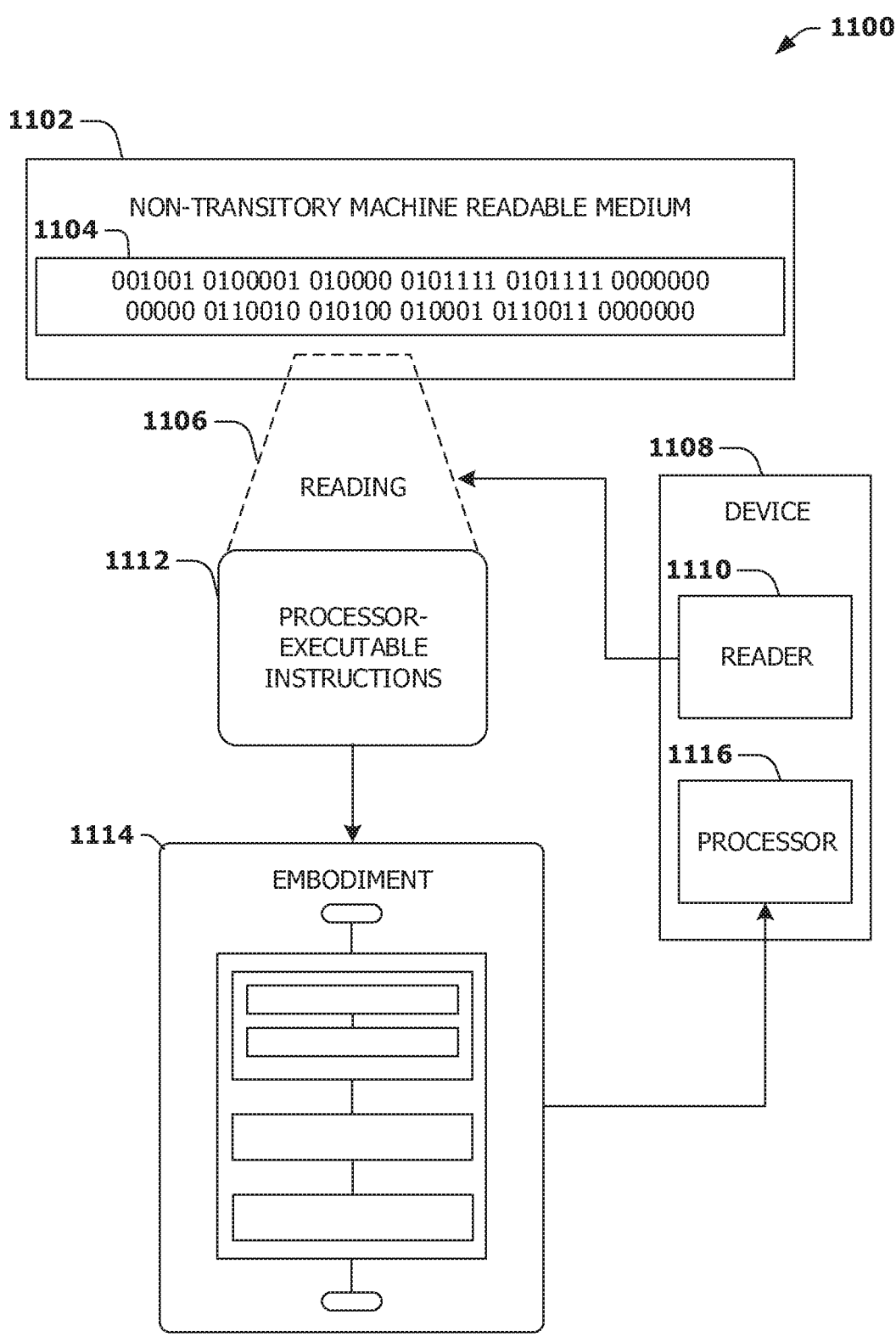
FIG. 11 is an illustration of a scenario featuring an example non-transitory machine readable medium in accordance with one or more of the provisions set forth herein.

FIG. 11 is an illustration of a scenario 1100 involving an example non-transitory machine readable medium 1102. The non-transitory machine readable medium 1102 may comprise processor-executable instructions 1112 that when executed by a processor 1116 cause performance (e.g., by the processor 1116) of at least some of the provisions herein (e.g., embodiment 1114). The non-transitory machine readable medium 1102 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 1102 stores computer-readable data 1104 that, when subjected to reading 1106 by a reader 1110 of a device 1108 (e.g., a read head of a hard disk drive, or a read operation invoked on a solid-state storage device), express the processor-executable instructions 1112. In some embodiments, the processor-executable instructions 1112, when executed, cause performance of operations, such as at least some of the example method 400A of FIG. 4A and the example method 400B of FIG. 4B, for example. In some embodiments, the processor-executable instructions 1112 are configured to cause implementation of a system, such as at least some of the example system 500 of FIG. 5, the example system 600 of FIG. 6, the example system 700 of FIG. 7, the example system 800 of FIG. 8, the example system 900A of FIG. 9A, the example system 900B of FIG. 9B and/or the example system 1000 of FIG. 10, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for generating a time-lapse video, comprising:

identifying a first set of video frames and a second set of video frames from a plurality of video frames, associated with a video, in a memory structure, the first set of video frames comprising a first number of video frames and the second set of video frames comprising a second number of video frames;

combining the first set of video frames to generate a first time-lapse video frame;

combining the second set of video frames to generate a second time-lapse video frame; and generating a time-lapse video based upon the first time-lapse video frame and the second time-lapse video frame.

2. The method of claim 1, comprising:

determining the first number of video frames based upon a first value identified in a window size data structure and the second number of video frames based upon a second value identified in the window size data structure.

3. The method of claim 2, comprising:

generating a curve based upon an analysis of the video; and generating the window size data structure based upon the curve.

4. The method of claim 2, comprising:

determining a third number of video frames based upon a third value identified in the window size data structure;

determining a fourth number of video frames based upon a fourth value identified in the window size data structure;

determining a fifth number of video frames based upon a fifth value identified in the window size data structure; and identifying a first plurality of sets of video frames corresponding to the third number of video frames, a second plurality of sets of video frames corresponding to the fourth number of video frames and a third plurality of sets of video frames corresponding to the fifth number of video frames from the plurality of video frames.

5. The method of claim 4, comprising:

combining the first plurality of sets of video frames to generate a first plurality of time-lapse video frames;

combining the second plurality of sets of video frames to generate a second plurality of time-lapse video frames; and combining the third plurality of sets of video frames to generate a third plurality of time-lapse video frames.

6. The method of claim 5, the time-lapse video generated based upon the first plurality of time-lapse video frames, the second plurality of time-lapse video frames and the third plurality of time-lapse video frames, the method comprising:

providing for displaying a first portion of the time-lapse video comprising the first plurality of time-lapse video frames;

providing for displaying a second portion of the time-lapse video comprising the second plurality of time-lapse video frames after the displaying the first portion of the time-lapse video; and providing for displaying a third portion of the time-lapse video comprising the third plurality of time-lapse video frames after the displaying the second plurality of time-lapse video frames.

7. The method of claim 6, the third number of video frames less than the fourth number of video frames; and the fifth number of video frames less than the fourth number of video frames.

8. The method of claim 7, the first portion of the time-lapse video comprising a representation of a first portion of the video at a first speed;

the second portion of the time-lapse video comprising a representation of a second portion of the video at a second speed; and the third portion of the time-lapse video comprising a representation of a third portion of the video at a third speed, the first speed less than the second speed and the third speed less than the second speed.

9. The method of claim 1, the first number of video frames equal to the second number of video frames.

10. The method of claim 1, the first number of video frames not equal to the second number of video frames.

11. The method of claim 1, the combining the first set of video frames comprising averaging the first set of video frames; and the combining the second set of video frames comprising averaging the second set of video frames.

12. The method of claim 1, the first set of video frames comprising one or more video frames that are also in the second set of video frames.

13. A method for presenting a live-stream video, comprising:

determining a time-lapse video associated with a recorded video associated with a live-stream video;

responsive to receiving a request to access the live-stream video, presenting the time-lapse video; and responsive to a completion of the presenting the time-lapse video, presenting the live-stream video from a first starting time.

14. The method of claim 13, a plurality of video frames associated with the time-lapse video ending with a last video frame;

the live-stream video beginning with a first live-stream video frame; and the first live-stream video frame representing a continuation of the last video frame.

15. The method of claim 13, the request to access the live-stream video received at a first time, the method comprising:

responsive to receiving a request to access the live-stream video at a second time, presenting a second time-lapse video associated with the live-stream video; and responsive to a completion of the presenting the second time-lapse video, presenting the live-stream video from a second starting time.

16. A computing device comprising:

a processor; and memory comprising processor-executable instructions that when executed by the processor cause performance of operations, the operations comprising:

identifying a first set of video frames and a second set of video frames from a plurality of video frames associated with a video, the first set of video frames comprising a first number of video frames and the second set of video frames comprising a second number of video frames;

combining the first set of video frames to generate a first time-lapse video frame;

combining the second set of video frames to generate a second time-lapse video frame; and generating a time-lapse video based upon the first time-lapse video frame and the second time-lapse video frame.

17. The computing device of claim 16, the first number of video frames equal to the second number of video frames.

18. The computing device of claim 16, the first number of video frames not equal to the second number of video frames.

19. The computing device of claim 16, the combining the first set of video frames comprising averaging the first set of video frames; and the combining the second set of video frames comprising averaging the second set of video frames.

20. The computing device of claim 16, the first set of video frames comprising one or more video frames that are also in the second set of video frames.

\* \* \* \* \*